No. 658,176. Patented Sept. 18, 1900.
E. P. HOLDEN.
CAN SOLDERING MACHINE.
(Application filed May 8, 1899.)
(No Model.) 5 Sheets—Sheet 1.
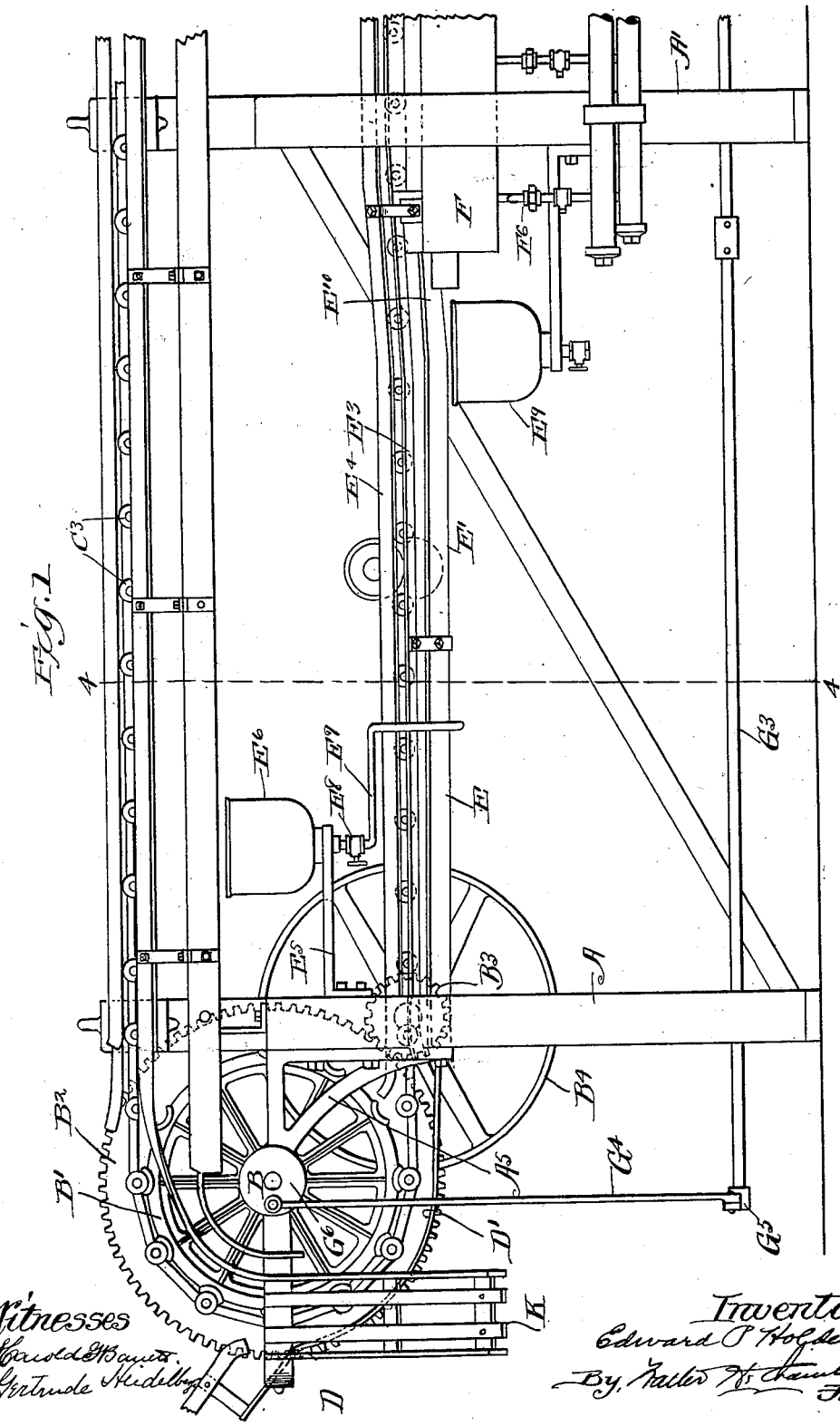

No. 658,176. Patented Sept. 18, 1900.
E. P. HOLDEN.
CAN SOLDERING MACHINE.
(Application filed May 8, 1899.)
(No Model.) 5 Sheets—Sheet 2.
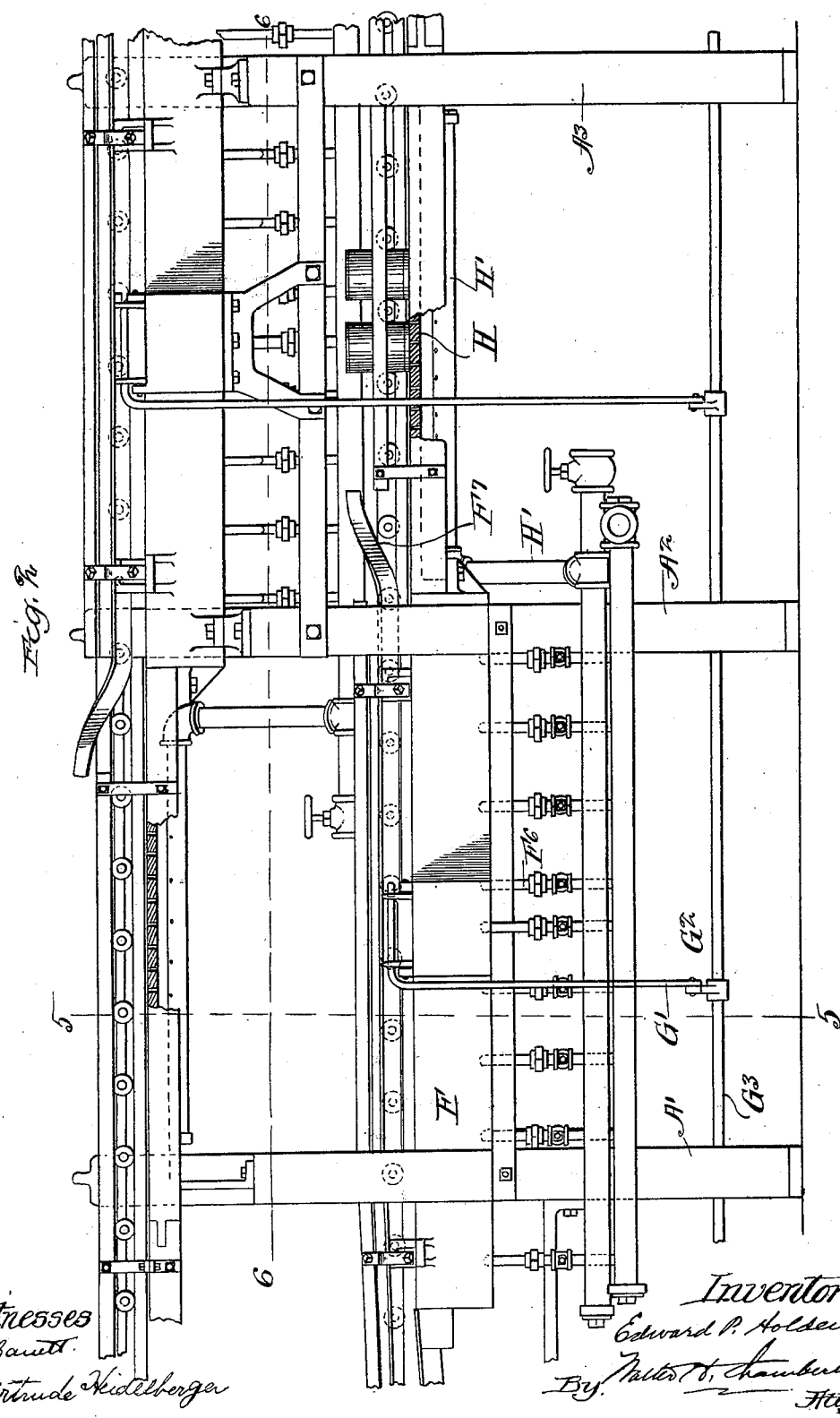

No. 658,176. Patented Sept. 18, 1900.
E. P. HOLDEN.
CAN SOLDERING MACHINE.
(Application filed May 8, 1899.)
(No Model.) 5 Sheets—Sheet 3.
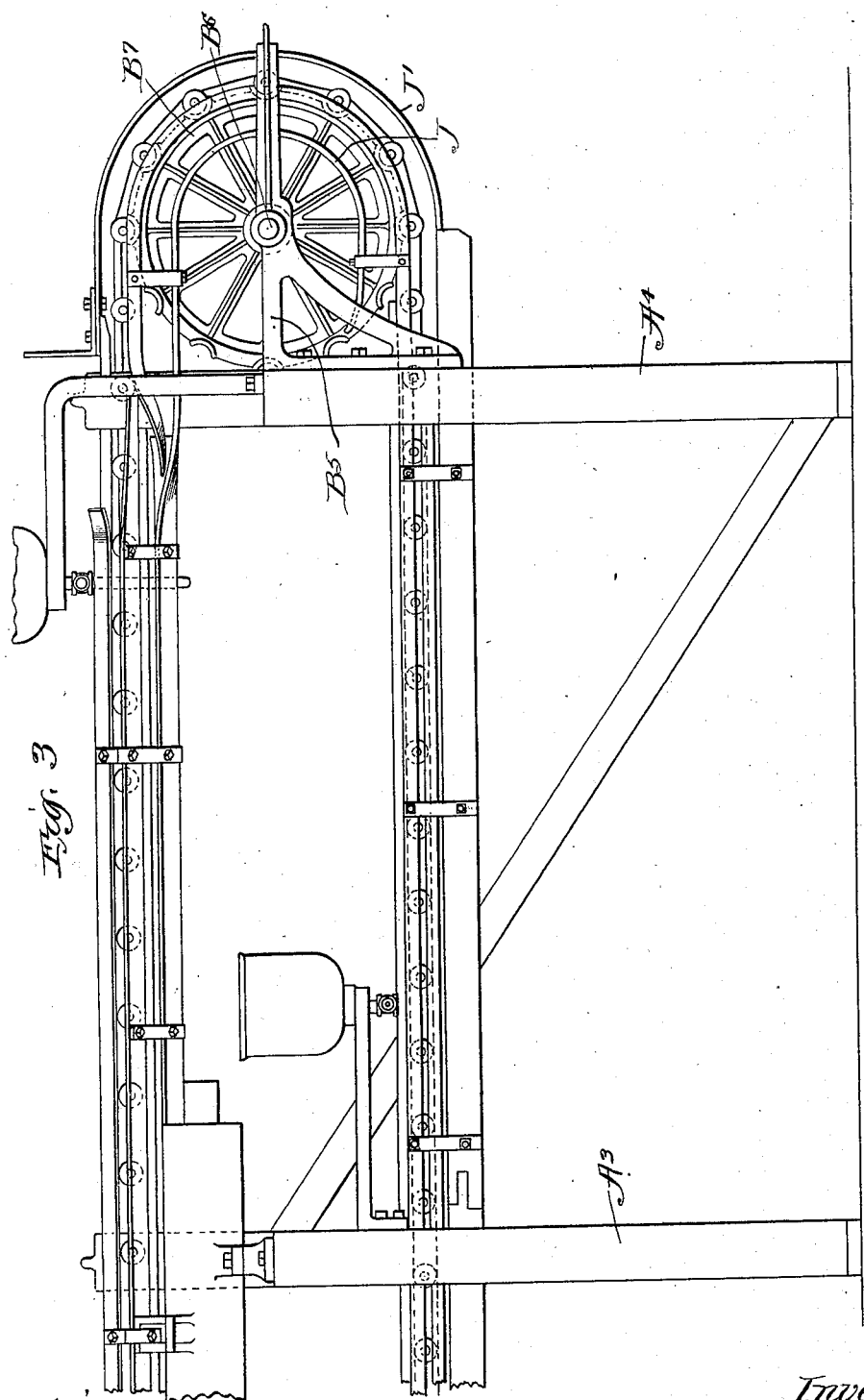

No. 658,176. Patented Sept. 18, 1900.
E. P. HOLDEN.
CAN SOLDERING MACHINE.
(Application filed May 8, 1899.)
(No Model.) 5 Sheets—Sheet 4.
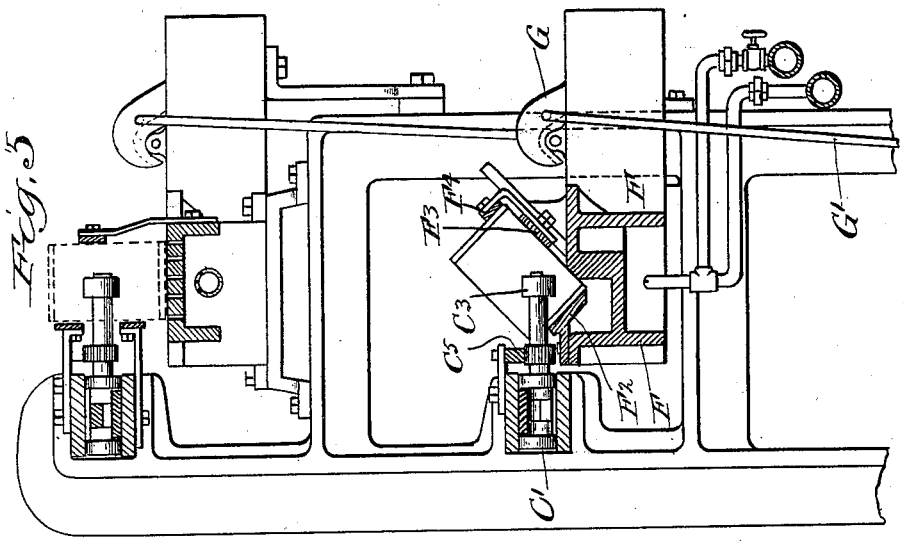
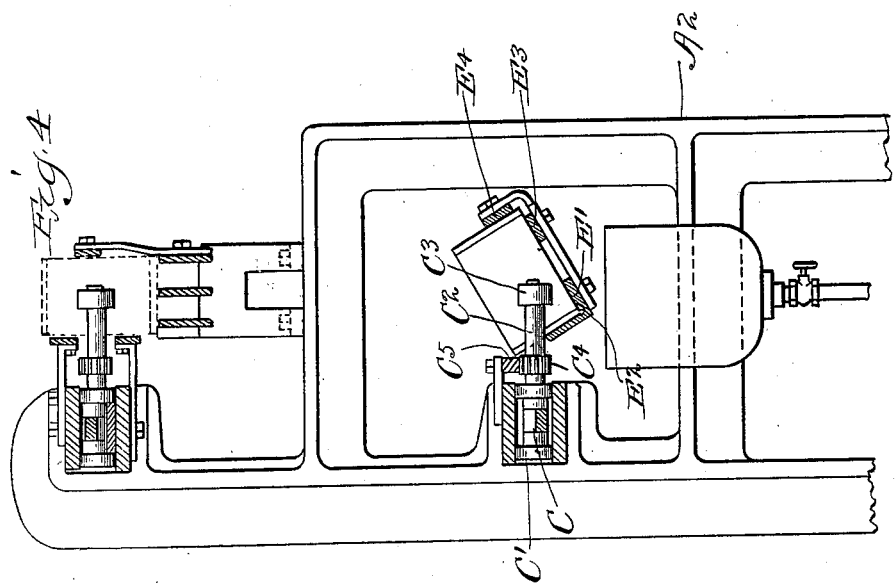
Witnesses
H. B. Barrett
Gertrude Heidelberger
Inventor:
Edward P. Holden
By Walter H. Chamberlin
Atty.
THE NORRIS PETERS CO., PHOTO-LITHO., WASHINGTON, D. C.

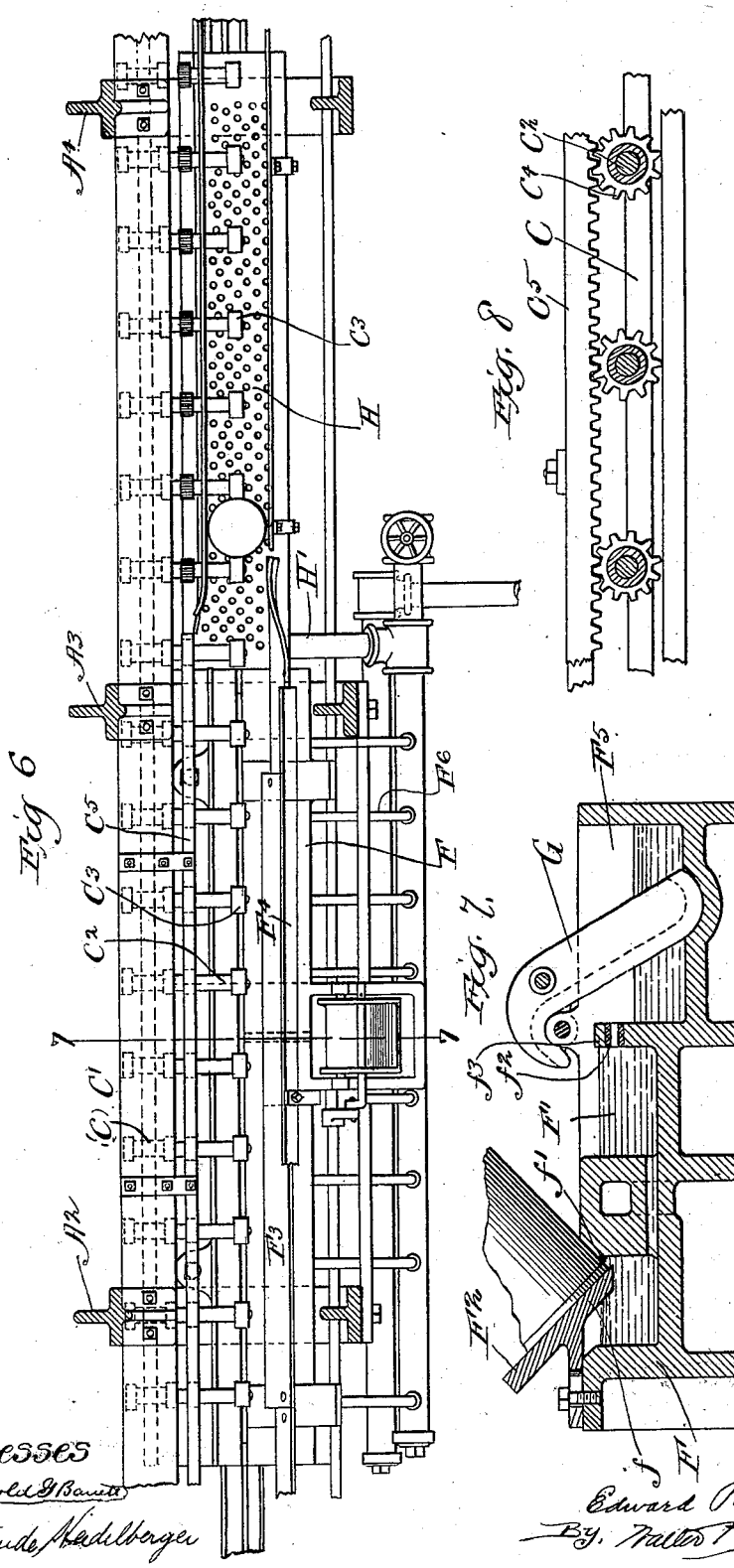

UNITED STATES PATENT OFFICE.

EDWARD P. HOLDEN, OF CHICAGO, ILLINOIS, ASSIGNOR TO JAMES L. BOARD, OF SAME PLACE.

CAN-SOLDERING MACHINE.

SPECIFICATION forming part of Letters Patent No. 658,176, dated September 18, 1900.

Application filed May 8, 1899. Serial No. 715,952. (No model.)

*To all whom it may concern:*

Be it known that I, EDWARD P. HOLDEN, a citizen of the United States, residing at Chicago, county of Cook, State of Illinois, have invented a certain new and useful Improvement in Can-Soldering Machines; and I declare the following to be a full, clear, and exact description of the invention, such as will enable others skilled in the art to which it pertains to make and use the same, reference being had to the accompanying drawings, which form a part of this specification.

My invention has for its object the production of a soldering-machine of that class known as "floating" soldering-machines—that is, a machine wherein the can is pushed or rolled through the successive operations necessary to solder the ends onto the body.

In the drawings, Figures 1, 2, and 3, coupled together, represent a side elevation of the entire machine. Fig. 4 is a vertical section on the line 4 4 of Fig. 1. Fig. 5 is a vertical section on the line 5 5 of Fig. 2. Fig. 6 is a horizontal section looking from above on the line 6 6 of Fig. 2. Fig. 7 is an enlarged cross-section of the soldering-vat on the line 7 7 of Fig. 6. Fig. 8 is an enlarged detail of the rack-bar.

In carrying out the invention, $A, A', A^2, A^3$, and $A^4$ represent suitable carrying frames or arches, preferably made of T-iron, as shown. From these arches or frames the various parts of the machine are sustained.

Journaled in suitable brackets $A^5$, extending from the frame A, is a shaft B, carrying a sprocket-wheel $B'$. On the same shaft B is a gear-wheel $B^2$, and meshing therewith is a pinion $B^3$ on a counter-shaft, the latter also carrying the band-wheel $B^4$, which drives the machine. On the opposite end of the machine and journaled in the brackets $B^5$, Fig. 3, is another shaft $B^6$, carrying another sprocket-wheel $B^7$. Passing around these two sprocket-wheels $B'$ and $B^7$ is a sprocket-chain made up in cross-section substantially as shown in Figs. 4 and 5, each link consisting of a main portion C, with antifriction-wheels $C'$ and a horizontally-projecting arm $C^2$. Journaled on the arm $C^2$, so as to readily revolve, is a sleeve carrying a roller $C^3$ and a pinion $C^4$, and at certain points in the operation the pinion $C^4$ on the arm $C^2$ engages with the rack-bar $C^5$, and thus revolves the roller $C^3$. The several links are pivoted together, so that when the sprocket-wheel $B'$ is revolved the entire conveying apparatus moves.

In order that the invention may be clearly understood, I will describe the movements of the can and describe the mechanism in detail as each particular set is reached.

Referring to Fig. 1, the can is fed through a chute D into the machine between two of the arms $C^2$ of the chain. It rolls down the strip $D'$ to the fluxing-vat E. This vat is shown in detail in Fig. 4. It is made up of a piece of angle-iron $E'$, having a groove $E^2$. The edge of the can rolls in this piece of angle-iron, with the seam between the can-body and can end rolling in the groove $E^2$. The other end of the can is supported by the strips $E^3$ $E^4$. Supported by the bracket $E^5$, Fig. 1, is a vessel $E^6$, containing the liquid flux. A pipe $E^7$, controlled by a valve $E^8$, leads therefrom down to a point below the strip $E'$ and up through the bottom of the same, so that the flux is fed in the groove $E^2$. At a point adjacent to the end of the flux-vat E and underneath the same is another receptacle $E^9$, with an orifice in the bottom of the vat E, so that the flux can drop back into the receptacle $E^9$. The end of the vat E beyond the orifice is inclined upward slightly, as shown at $E^{10}$, Fig. 1, so that any flux carried beyond by the rolling can will run back. The can now reaches the solder-vat F, Fig. 2. This vat is shown in cross-section in Figs. 5 and 7. There is the receptacle proper, $F'$, Fig. 7, with a strip $F^2$ bolted thereto to receive and support the end of the can, this strip having a downward projection $f$, which extends into the solder. This strip is adjustable horizontally. On the vat proper is another projection $f'$, which supports the side of the can immediately above the seam to be soldered. It will be observed by reference to Fig. 7 that the projection $f$ extends down into the solder-bath and protects the entire end of the can. Between the point of the projection $f$ and the face of the projection $f'$ is thus left a small space, which is filled with a bead of the solder. As the can rolls along, the seam between the body and the end of the can rides in this bead of solder and picks up the desired quantity. The upper end of the can is supported by the strips F³ F⁴, Fig. 5.

Referring again to Figs. 6 and 7, it will be observed that the solder-vat at one point is enlarged or extended to form the auxiliary vat F⁵. The bottom of the vat F⁵ is at a slightly-lower level than the bottom of the vat F'. Pivoted from the walls of the vat F⁵ is what I will term a "dipper" G. Pivoted to this dipper is a rod G', Fig. 5, which extends down to a crank-arm G² on the shaft G³. This shaft G³ is oscillated by means of the rod G⁴, pivoted to the arm G⁵, and eccentrically pivoted to the disk G⁶ on the shaft B, so that as the shaft B revolves the rod G' is reciprocated and tilts the dipper G, and the latter picks up the solder in the vat F⁵ and allows it to run into the vat F'. An orifice $f^2$ through the partition $f^3$ maintains the solder in the vat F' at exactly the height desired. In order that the solder may flow freely and not bank up or clog the orifice $f^2$, I provide a copper or soft-metal tube coated with tin, so that the solder passes through a tinned surface. As the can rolls along through the vat F' the seam between the can-body and the can end rides in the solder, as shown in Fig. 7, and picks up a bead of it, as previously described. The solder-vat is of course heated from any suitable source—as, for instance, by the burners F⁶, Fig. 2. When the can reaches the end of the solder-vat, the strip F³ is turned up, as shown at F⁷, Fig. 2, and throws the can to the vertical position and onto the plate H. This plate is perforated and suitably heated from the pipe H'. The hot-air comes up through the orifices in the plate H and melting the solder that has adhered to the seam causes the solder to run into the seam and fill the same. The can is then pushed along on end until it reaches the end of the plate H and thence along a suitable slide until it reaches the sprocket-wheel B⁷. It then rides between the strips J J' and is carried around the sprocket-wheel. This action of course reverses the position of the can and brings the unsoldered end beneath. The guiding-strips then tilt the can to bring the seam in the proper position. The can is then carried through exactly the same operations as those just described, and when it reaches the end of the machine adjacent to the sprocket-wheel B' both ends have been effectively soldered. The can is then discharged through the chute K.

Suitably sustained from the main frame of the machine in the path of the pinions C⁴ is a rack-bar M. This rack-bar is located adjacent to the fluxing-vats and also adjacent to the soldering-vats. As the can is pushed along and reaches the rack-bars the pinion engages therewith, and the roller C³ is thus revolved and bearing against the side of the can allows it to revolve the can and prevents the latter from sliding rather than rolling.

What I claim is—

1. In a can-soldering machine a fluxing-vat made up of a piece of angle-iron in which the end of the can rolls, a groove in the bottom of said vat, a receptacle above the vat with means for admitting a continuous stream of flux into the vat and a receptacle to receive the flux at the discharge end of the vat, substantially as described.

2. In a can-soldering machine a fluxing-vat through which the can is rolled provided with means for admitting a continuous stream of flux to the vat at its forward end the bottom of said vat provided substantially at its end with a discharge-orifice and the end of the vat inclined slightly upward beyond the orifice, substantially as described.

3. In a can-soldering machine the combination with ways along which the can is rolled of pusher-arms extending horizontally behind each can, each of said arms provided with an antifriction-roller, a stationary rack-bar adjacent to the path of each arm and a pinion connected with the roller and adapted to engage the rack-bar, substantially as described.

4. In a can-soldering machine a soldering-vat and an auxiliary vat adjacent thereto, a partition between the two and a discharge-orifice between the two, said orifice having its surface tinned, substantially as described.

5. In a can-soldering machine a solder-vat and an auxiliary vat adjacent thereto, a partition between the two and a discharge-orifice between the two said orifice having a soft-metal lining coated with tin, substantially as described.

In testimony whereof I sign this specification in the presence of two witnesses.

EDWARD P. HOLDEN.

Witnesses:
WALTER H. CHAMBERLIN,
GERTRUDE HEIDELBERGER.